(12) United States Patent
Jeon et al.

(10) Patent No.: US 11,585,383 B2
(45) Date of Patent: Feb. 21, 2023

(54) SENSING APPARATUS FOR VEHICLE, WHEEL BEARING ASSEMBLY, AND METHOD FOR MANUFACTURING SENSING APPARATUS FOR VEHICLE

(71) Applicant: ILJIN GLOBAL Co.,Ltd, Seoul (KR)

(72) Inventors: Chan Goo Jeon, Seoul (KR); Young Tae Kim, Seoul (KR); Joung Woo Hur, Seoul (KR)

(73) Assignee: ILJIN GLOBAL Co., Ltd, Seoul (KR)

( * ) Notice: Subject to any disclaimer, the term of this patent is extended or adjusted under 35 U.S.C. 154(b) by 37 days.

(21) Appl. No.: 17/204,607

(22) Filed: Mar. 17, 2021

(65) Prior Publication Data
US 2021/0293280 A1 Sep. 23, 2021

Related U.S. Application Data

(63) Continuation of application No. PCT/KR2019/008597, filed on Jul. 11, 2019.

(30) Foreign Application Priority Data

Sep. 17, 2018 (KR) .......................... 10-2018-0110976

(51) Int. Cl.
F16C 41/00 (2006.01)
G01P 3/44 (2006.01)

(52) U.S. Cl.
CPC ............ *F16C 41/007* (2013.01); *G01P 3/443* (2013.01); *F16C 2326/02* (2013.01)

(58) Field of Classification Search
CPC ..... F16C 41/007; F16C 2326/02; G01D 5/14; G01D 5/142; G01D 5/145; G01D 5/147;
(Continued)

(56) References Cited

U.S. PATENT DOCUMENTS

2003/0093188 A1* 5/2003 Morita ................ B60C 23/0408
701/1
2006/0070462 A1* 4/2006 Takizawa ............ G01M 13/045
73/862.541
(Continued)

FOREIGN PATENT DOCUMENTS

CN 104969040 A * 10/2015 ........... G01D 11/245
FR 2852464 A1 * 9/2004 ........... F16C 41/007
(Continued)

OTHER PUBLICATIONS

International Search Report of PCT/KR2019/008597 dated Oct. 31, 2019.

*Primary Examiner* — Phillip A Johnson
(74) *Attorney, Agent, or Firm* — Dinsmore & Shohl LLP; Yongsok Choi, Esq.

(57) ABSTRACT

A sensing device for vehicle includes a first sensing part configured to sense first information related to a wheel to generate a first signal; a second sensing part configured to sense second information related to the wheel to generating a second signal; a first insert to which the first sensing part is fixed; a second insert to which the second sensing part is fixed, the second insert being coupled to the first insert; at least one first connection part connected to the first sensing part and configured to supply a first power to the first sensing part or to transmit the first signal; at least one second connection part connected to the second sensing part and configured to supply a second power to the second sensing part or to transmit the second signal; and a body configured to accommodate the first and second sensing parts therein.

20 Claims, 10 Drawing Sheets

(58) Field of Classification Search
CPC ......... G01D 11/245; G01P 1/02; G01P 3/443; G01P 3/487; B60B 27/068
See application file for complete search history.

(56) References Cited

U.S. PATENT DOCUMENTS

| | | | |
|---|---|---|---|
| 2007/0053623 A1* | 3/2007 | Maeda | G01P 3/487 384/544 |
| 2011/0127995 A1* | 6/2011 | Nishikawa | F16C 41/007 324/207.25 |
| 2014/0002066 A1* | 1/2014 | Barcat | G01P 3/487 312/223.1 |
| 2017/0153265 A1 | 6/2017 | Yamamoto et al. | |

FOREIGN PATENT DOCUMENTS

| | | | | |
|---|---|---|---|---|
| JP | 2008008754 A | 1/2008 | | |
| JP | 2008145258 A | 6/2008 | | |
| KR | 101514410 B1 | 5/2015 | | |
| KR | 101857191 B1 | 5/2018 | | |
| WO | WO-2012020654 A1 * | 2/2012 | ......... | B60B 27/0005 |

* cited by examiner

SENSING APPARATUS FOR VEHICLE, WHEEL BEARING ASSEMBLY, AND METHOD FOR MANUFACTURING SENSING APPARATUS FOR VEHICLE

CROSS-REFERENCE TO RELATED APPLICATIONS

This is a continuation of International Application No. PCT/KR2019/008597 filed on Jul. 11, 2019, which claims priority to Korean Patent Application No. 10-2018-0110976 filed on Sep. 17, 2018, the entire contents of which are herein incorporated by reference.

TECHNICAL FIELD

The present disclosure relates to a sensing device for sensing information related to a wheel for vehicle, a wheel bearing assembly comprising a sensing device for vehicle, and a method of manufacturing a sensing device for vehicle.

BACKGROUND ART

In various types of application systems, such as an Anti-Lock Brake System (ABS) applied to a conventional vehicle, the rotation speed and rotation direction of a wheel are measured. For example, the ABS is a system for preventing a vehicle from overturning or being skidded due to full-locking of a wheel by a brake at the time of braking the vehicle, and is configured to measure the rotation speed and rotation direction of a wheel by a wheel speed sensor in order to achieve such a purpose. The wheel speed sensor may comprise a target member provided in a ring shape on an inner ring of a bearing coupled to a rotational shaft of the wheel. The target member comprises a plurality of magnetic pole pairs. In the wheel speed sensor having such a configuration, the rotation speed and rotation direction of the wheel are measured based on the rotation speed and rotation direction of the target member. The measurement accuracy is determined by the number of magnetic pole pairs. Further, various sensing techniques for sensing information related to the wheel of vehicle are known.

SUMMARY

Technical Problem

With the development of automobile technology such as autonomous driving, the importance of technologies for acquiring various information related to wheels or improving the reliability of the information is increasing. Embodiments of the present disclosure provide a sensing technology for vehicle that acquires various types of information in a more reliable manner.

In a case in which two sensors are provided in a single sensing device, it is necessary to assemble components in a very narrow region, which causes a problem in that a process is difficult. Embodiments of the present disclosure solve such a problem.

Technical Solution

One aspect of the present disclosure provides embodiments of a sensing device for vehicle. The sensing device for vehicle according to a representative embodiment may comprise: a first sensing part configured to sense first information related to a wheel to generate a first signal; a second sensing part configured to sense second information related to the wheel to generate a second signal; a first insert to which the first sensing part is fixed; a second insert to which the second sensing part is fixed, the second insert being coupled to the first insert; at least one first connection part connected to the first sensing part and configured to supply a first power to the first sensing part or to transmit the first signal from the first sensing part; at least one second connection part connected to the second sensing part and configured to supply a second power to the second sensing part or to transmit the second signal from the second sensing part; and a body configured to accommodate the first sensing part and the second sensing part therein and to support the first insert and the second insert.

In one embodiment, at least a portion of the first insert and at least a portion of the second insert may be disposed inside the body.

In one embodiment, the first sensing part may be provided in one direction relative to a coupled body of the first insert and the second insert, and the second sensing part may be provided in the opposite direction of the one direction.

In one embodiment, the first insert and the second insert may be located between a first connection point where the first sensing part and the first connection part are connected to each other and a second connection point where the second sensing part and the second connection part are connected to each other.

In one embodiment, the first insert may comprise a coupling surface formed to face the second insert; a first outer surface formed be oriented in the opposite direction of the coupling surface; and a first-connection-part guide configured to guide a position of one end portion of the first connection part and provided on the first outer surface. The second insert may comprise a counterpart surface formed to be in contact with the coupling surface; a second outer surface formed be oriented in the opposite of the counterpart surface; and a second-connection-part guide configured to guide a position of one end portion of the second connection part and provided on the second outer surface.

In one embodiment, the second insert may further comprise an auxiliary surface formed to be oriented in the same direction with the counterpart surface; and an auxiliary guide configured to guide a position of the first connection part and provided on the auxiliary surface.

In one embodiment, the first sensing part may comprise a first sensor configured to generate the first signal; and a first terminal portion connected to the first connection part and configured to transmit the first signal or receive the first power. The second sensing part may comprise a second sensor configured to generate the second signal; and a second terminal portion connected to the second connection part and configured to transmit the second signal or receive the second power. The first terminal portion and the second terminal portion may be arranged outside the coupled body of the first insert and the second insert.

In one embodiment, the first sensor and the second sensor may be in contact with each other, or spaced apart from each other by 2 mm or less.

In one embodiment, the first insert may have a first hole formed at a portion corresponding to a first connection point where the first sensing part and the first connection part are connected. The second insert may have a second hole formed at a portion corresponding to a second connection point where the second sensing part and the second connection part are connected.

In one embodiment, the first hole and the second hole may be located between the first connection point and the second connection point.

In one embodiment, a penetration direction of the first hole and a penetration direction of the second hole may be parallel to each other.

In one embodiment, the first insert and the second insert may be coupled to each other in a direction parallel to a penetration direction of the first hole.

In one embodiment, the first insert may comprise a coupling portion formed to protrude toward the second insert, and the second insert may comprise a coupling counterpart portion of forming a groove into which the coupling portion is engaged.

In one embodiment, the first insert may further comprise a stepped surface formed on a surface facing the second insert, and the second insert may further comprise a stepped-surface counterpart surface in contact with the stepped surface.

In one embodiment, at least one of the first information and the second information may comprise rotation speed information of the wheel.

Another aspect of the present disclosure provides embodiments of a wheel bearing assembly. The wheel bearing assembly according to a representative embodiment may comprise an outer ring part; an inner ring part configured to be rotatable relative to the outer ring part while rotating together with a wheel; and a sensing device configured to sense information related to the wheel. The sensing device may comprise: a body provided fixedly relative to the outer ring part; a first sensing part provided in the body and configured to sense first information related to the wheel to generate a first signal; a second sensing part provided in the body and configured to sense second information related to the wheel to generate a second signal; a first insert supported by the body and to which the first sensing part is fixed; a second insert supported by the body and to which the second sensing part is fixed, the second insert being coupled to the first insert; at least one first connection part connected to the first sensing part and configured to supply a first power to the first sensing part or to transmit the first signal from the first sensing part; and at least one second connection part connected to the second sensing part and configured to supply a second power to the second sensing part or to transmit the second signal from the second sensing part.

Yet another aspect of the present disclosure provides embodiments of a method of manufacturing a sensing device for vehicle. The method of manufacturing a sensing device for vehicle according to a representative embodiment may comprise: a step (a) of connecting a first sensing part and a first connection part by arranging the first sensing part and one end portion of the first connection part on a first insert, the first sensing part being configured to sense first information related to a wheel to generate a first signal and the first connection part being configured to supply a first power to the first sensing part or transmit the first signal from the first sensing part, and of connecting a second sensing part and a second connection part by arranging the second sensing part and one end portion of the second connection part on a second insert, the second sensing part being configured to sense second information related to the wheel to generate a second signal and the second connection part being configured to supply a second power to the second sensing part or transmit the second signal from the second sensing part; and a step (b) of coupling the first insert and the second insert after the step (a).

In one embodiment, the method may further comprise, after the step (b), a step (c) of injection-molding a body such that at least a portion of the first insert, at least a portion of the second insert, the first sensing part and the second sensing part are disposed inside the body.

In one embodiment, in the step (a), a first terminal constituting the one end portion of the first connection part and a first connection line of the first connection part may be coupled, and a second terminal constituting the one end portion of the second connection part and a second connection line of the second connection part may be coupled.

In one embodiment, in the step (a), the first sensing part and the first connection part may be welded by inserting a welding tool into a first hole of the first insert, and the second sensing part and the second connection part may be welded by inserting the welding tool into a second hole of the second insert.

Advantageous Effects

According to embodiments of the present disclosure, even if failure or malfunction occurs in any one of a plurality of sensing parts, it is possible to operate a vehicle system in a normal state by the other sensing part.

According to embodiments of the present disclosure, by sensing various and complex information on a wheel through the plurality of sensing parts, it is possible to control a vehicle with higher accuracy in various manners.

According to embodiments of the present disclosure, by employing a configuration in two inserts are coupled to each other, it is possible to assemble components in a relatively wide space. Thus, it is possible to accurately perform a manufacturing process in a convenient manner. Particularly, in the case of performing a process of welding a sensing part and a connection part corresponding thereto, the process convenience can be remarkably improved.

EXPLANATION OF REFERENCE NUMERALS

Figure 1:
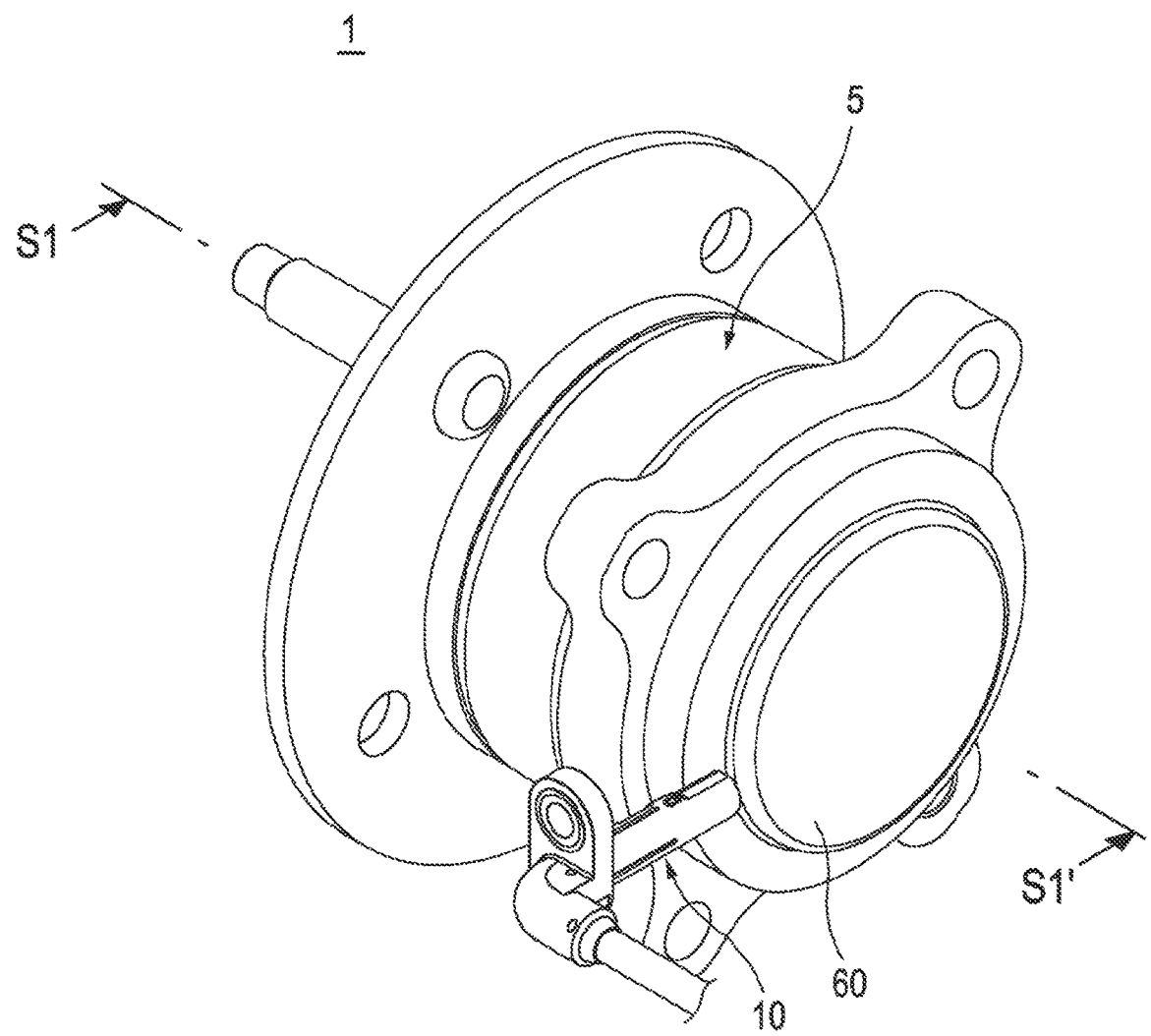
FIG. 1 is a perspective view of a wheel bearing assembly 1 according to one embodiment of the present disclosure.

1, 1': wheel bearing assembly, 5: wheel bearing, 10, 10': sensing device, 30: inner ring part, 40: outer ring part, 110: first sensing part, 130: second sensing part, 210: first insert, 230: second insert, 310: first connection part, 320: second connection part, 400: body, 500: fixing part

DETAILED DESCRIPTION

Embodiments of the present disclosure are exemplified for the purpose of describing the technical spirit of the present disclosure. The scope of the claims according to the present disclosure is not limited to the embodiments described below or to the detailed descriptions of these embodiments.

Unless otherwise defined, all technical and scientific terms used herein have the same meaning commonly understood by those skilled in the art to which the present disclosure pertains. All terms used herein are selected for the purpose of more clearly describing the present disclosure and not limiting the scope of the present disclosure defined by appended claims.

Unless the phrase or sentence clearly indicates otherwise, terms "comprising" "including" "having" and the like used herein should be construed as open-ended terms encompassing the possibility of including other embodiments.

The singular form described herein may include the plural form unless the context clearly dictates otherwise, and this is equally applied to the singular form set forth in the claims.

Terms a "first," a "second," and the like are used to distinguish a plurality of components, and the order or importance of corresponding components is not limited by these terms.

The expression "based on" used herein is used to describe one or more factors that influence the action or operation of a decision and determination described in a phrase or sentence in which the expression is included. This expression does not exclude additional factors that influence the action or operation of the decision and determination.

Throughout the present disclosure, when a component is referred to as being "connected" or "coupled" to another component, the component can be directly connected or coupled to another component, or can be connected or coupled to another component by intervening yet another component therebetween.

Dimensions and numerical values described in the present disclosure are not limited only to the dimensions and numerical values described herein. Unless otherwise specified, these dimensions and numerical values may be understood to mean the values described herein and the equivalent ranges including the described values. For example, a dimension of "2 mm" described herein may be understood to include "about 2 mm".

A directional directive of a "radially outward direction" used herein means a direction away from a rotational axis in a radial direction with respect to the rotational axis of a rotating body, and a directional directive of a "radially inward direction" means a direction opposite to the radially outward direction. Further, a directional directive of an "axially outward direction" used herein means a direction oriented outward of a vehicle body along the rotational axis of the rotating element, and a directional directive of an "axially inward direction" means a direction oriented inward of the vehicle body along the rotational axis of the rotating element. Throughout the drawings, there are illustrated a rotational axis C of the rotating body, a radially outward direction OR, a radially inward direction IR, an axially outward direction OA, and an axially inward direction IA.

Hereinafter, embodiments of the present disclosure will be described with reference to the accompanying drawings. In the accompanying drawings, the same reference numerals are assigned to the same or corresponding components. Further, in the following descriptions of the embodiments, duplicate descriptions of the same or corresponding components may be omitted. However, even though a description of a component is omitted, such a component is not intended to be excluded in any embodiment.

FIG. 1 is a perspective view of a wheel bearing assembly 1 according to one embodiment of the present disclosure. Referring to FIG. 1, the wheel bearing assembly 1 comprises a wheel bearing 5 provided between a vehicle wheel and a vehicle body. The wheel bearing assembly 1 comprises at least one sensing device 10 provided in the wheel bearing 5.

Figure 2:
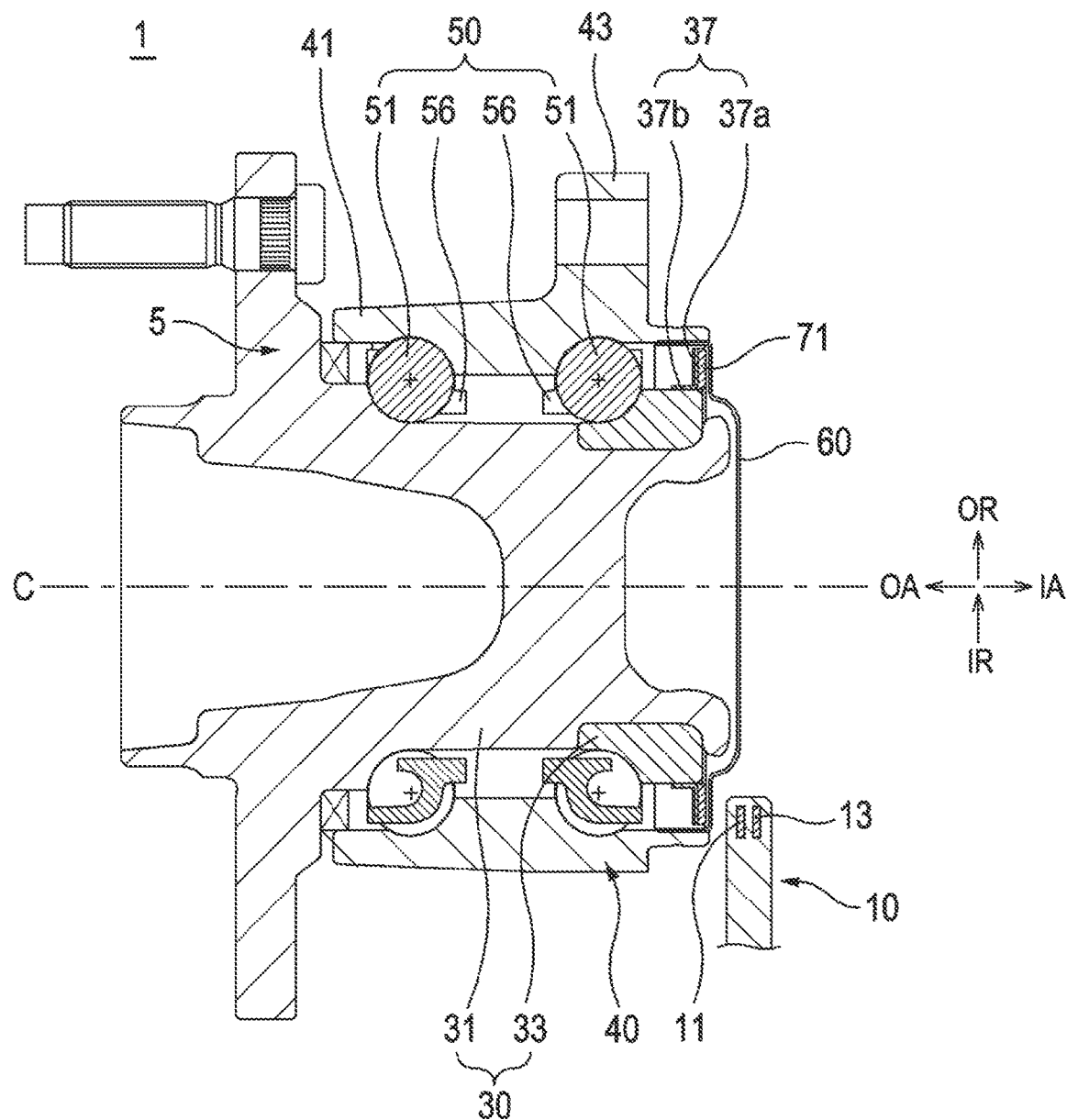
FIG. 2 is a cross-sectional view of the wheel bearing assembly 1, taken along line S1-S1' in FIG. 1.

FIG. 2 is a cross-sectional view of the wheel bearing assembly 1 in FIG. 1, taken along line S1-S1' in FIG. 1. Referring to FIG. 2, the wheel bearing 5 comprises an outer ring part 40 fixed to a vehicle body, and an inner ring part 30 configured to be rotatable relative to the outer ring part 40. The outer ring part 40 rotatably support the inner ring part 30.

The outer ring part 40 may comprise an outer ring 41. The outer ring 41 is coupled to a knuckle (not shown). The outer ring part 40 comprises a flange 43 formed to protrude in the radially outward direction OR from the outer ring 41. The outer ring part 40 and the knuckle may be coupled to each other by means of a knuckle bolt (not shown) passing through the flange 43 in the axially direction OA or IA.

The inner ring part 30 is configured to rotate together with the wheel. The inner ring part 30 may comprise a wheel hub 31 and an inner ring 33. However, in another embodiment (not shown), the inner ring part 30 may be comprised of the wheel hub 31 alone. The following descriptions will be made on the inner ring part 30 of the present embodiment. The inner ring 33 is press-fitted to an outer peripheral surface of the wheel hub 31. The inner ring 33 rotates together with the wheel hub 31. The wheel is coupled to the wheel hub 31 so that they rotate in an integral manner. The wheel hub 31 has a flange formed to protrude in the radially outward direction OR. The wheel hub 31 and the wheel may be coupled to each other by means of a hub bolt passing through the flange of the wheel hub 31 in the axially direction OA or IA.

The expression "a first component rotates together with a second component" used herein means that the first component rotates in the same direction and the same rotation speed as the second component, and may encompass a case where the first component is coupled (or connected) to the second component such that they rotate as a unit, and a case where the first component is coupled (or connected) to a third component and the third component is coupled (or connected) to the second component such that the first component rotates together with the second component.

The wheel bearing 5 comprises a bearing 50 disposed between the outer ring part 40 and the inner ring part 30. The bearing 50 is disposed between an outer peripheral surface of the inner ring part 30 and an inner peripheral surface of the outer ring part 40.

The bearing 50 may comprise a plurality of rolling elements 51 disposed between the outer peripheral surface of the wheel hub 31 and the inner peripheral surface of the outer ring 41 facing the outer peripheral surface of the wheel hub 31. In addition, the bearing 50 may comprise a plurality of rolling elements 51 disposed between the outer peripheral surface of the inner ring 33 and the inner peripheral surface of the outer ring 41 facing outer peripheral surface of the inner ring 33.

In the present embodiment, the plurality of rolling elements 51 are arranged in two rows at predetermined intervals in the axially direction OA or IA. However, the number of rows of the plurality of rolling elements 51 in the axially direction OA or IA is not limited thereto. The plurality of rolling elements 51 may be arranged in one row or may be arranged in three or more rows. Further, in the present embodiment, the plurality of rolling elements 51 are shown as ball bearings. However, the plurality of rolling elements 51 may be formed as roller bearings, taper roller bearings, needle bearings, and the like. In addition, in the present embodiment, the plurality of rolling elements 51 are formed of a metallic material. However, the plurality of rolling elements 51 may be formed of various materials, such as plastic and the like.

The plurality of rolling elements 51 arranged in each row are arranged in a circumferential direction around the rotational axis C. The bearing 50 may comprise a retainer 56 configured to hold the plurality of rolling elements 51 at regular intervals along the circumferential direction. The retainer 56 restricts the position of the plurality of rolling elements 51. The retainer 56 is located between the outer ring part 40 and the inner ring part 30.

The sensing device 10 senses information related to the wheel. As an example, the sensing device 10 may be configured to sense rotation speed information of the wheel. The rotation speed information of the wheel may be information on a scalar quantity, which is the magnitude of a rotation speed of the wheel, or information on a vector quantity including the magnitude of the rotation speed and a rotational direction of the wheel. As another example, the sensing device 10 may be configured to sense rotation angle information of the wheel. As another example, the sensing device 10 may be configured to sense information on a magnetic field strength so as to provide basic information for determining whether or not an abnormality occurs in an encoder (target to be described later). As another example, the sensing device 10 may be configured to sense a temperature, acceleration, or pressure information at a specific point of the wheel bearing assembly 1 connected to the wheel. The sensing device 10 will be described with an embodiment in which the rotation speed information or the rotation angle information of each of the wheel is sensed, but is not necessarily limited thereto.

The wheel bearing 5 comprises a target 71. The target 71 is coupled to the inner ring part 30 and rotates together with the inner ring part 30. The target 71 is coupled to the inner ring 33 to be located radially outward of the rotational axis C. The target 71 has a ring shape and comprises different magnetic poles arranged alternately along the circumferential direction around the rotational axis C. For example, N poles and S poles are alternately arranged in the target 71. A plurality of magnetic pole pairs comprising N poles and S poles may be arranged in the target 71.

The target 71 may be coupled to the inner ring 33 by a first coupling member 37. The first coupling member 37 may comprise a target coupling portion 37a having a shape corresponding to that of the target 71, and an inner ring coupling portion 37b extending vertically from the target coupling portion 37a to be coupled to the outer peripheral surface of the inner ring 33. The first coupling member 37 may be coupled to the inner ring 33 by press-fitting the inner ring coupling portion 37b to the outer peripheral surface of the inner ring 33.

The wheel bearing 5 comprises a cap 60 coupled to an end portion of the outer ring 41 in the axially inward direction IA. The cap 60 covers an end portion of the inner ring part 30 in the axially inward direction IA. The cap 60 is coupled to the outer ring 41 to entirely cover the target 71. The cap 60 may be made of a reinforced plastic or a non-magnetic metal (for example, stainless steel). When the cap 60 is made of a non-magnetic metal, the cap 60 may be manufactured by pressing or punching a thin plate-shaped metallic material.

The cap 60 may be coupled to the inner peripheral surface of the outer ring 41. The cap 60 covers the inner ring part 30 and the target 71. The cap 60 is press-fitted to the inner peripheral surface of the outer ring 41 so as to be coupled to the outer ring 41 in an airtight sealing manner or in a water-tight sealing manner.

The sensing device 10 according to one embodiment of the present disclosure may detect a change in magnetic field caused by the rotation of the target 71. Sensing parts 11 and 13 of the sensing device 10 are arranged at a position spaced apart from the rotational axis C in the radially outward direction OR. The sensing device 10 extends in the radially direction IR or OR to form a distal end portion where the sensing parts 11 and 13 are located. The sensing device 10 is spaced apart from the target 71 in the axially inward direction IA.

The sensing device 10 may sensing a change in magnetic field (information related to the wheel) caused by the target 71 which rotates together with the wheel to generate a signal. Here, the information related to the wheel sensed by the sensing device 10 may be the rotation speed information of the wheel. The sensing device 10 transmits the generated signal to an Electronic Control Unit (ECU) of the vehicle.

In one embodiment, the sensing device 10 may sense the intensity of the magnetic field induced from the target 71 and generate a signal corresponding to the intensity of the magnetic field. For example, the sensing device 10 may output a positive electrical signal when being brought close to the N pole of the target 71 and may output a negative electrical signal when being brought close to the S pole of the target 71. Accordingly, when the target 71 having a pair of N and S poles rotates once, an electric signal value is outputted as zero at a boundary between the pair of N and S poles, and positive and negative electric signals representing the maximum intensity value of the magnetic field are outputted at the middle of each of the N pole and the S pole. Thus, a signal of a sine wave of one cycle can be outputted. Under such an operating principle, the resolution of the sensing device 10 may be determined based on the number of magnetic poles of the target 71. For example, when the target 71 has five pairs of N poles and S poles, an electrical signal of the sine wave of a total five-cycle is outputted while the target 71 rotates once. Thus, the sensing device 10 can measure the rotation speed of the wheel with a resolution of 72 degrees (360 degrees/5). In general, the target 71 has 43 to 80 pairs of magnetic poles. In this case, the sensing device 10 can sense the rotation speed information of the vehicle wheel with a resolution of about 3 to 8 degrees, and generate the signal.

The sensing parts 11 and 13 of the sensing device 10 may use at least one of a Hall effect, an Anisotropic Magneto-Resistance (AMR) effect, a Giant Magneto-Resistance (GMR) effect, and a Tunnel Magneto-Resistance (TMR) effect to sense the change in magnetic field of the target 71 according to the rotation of the wheel hub 31. For example, the sensing device 10 may measure a voltage which varies according to current applied to a magnetic body, and measure a resistance value of the magnetic body which changes according to a magnetic field induced by the AMR effect, the GMR effect or the TMR effect, thereby measuring the intensity value of the magnetic field induced to the magnetic body.

The sensing device 10 may comprise a plurality of sensing parts configured to sense information related to a wheel. The sensing device 10 may comprise a plurality of sensing parts 11 and 13. The plurality of sensing parts 11 and 13 may be arranged in the axially direction IA or OA.

Figure 3:
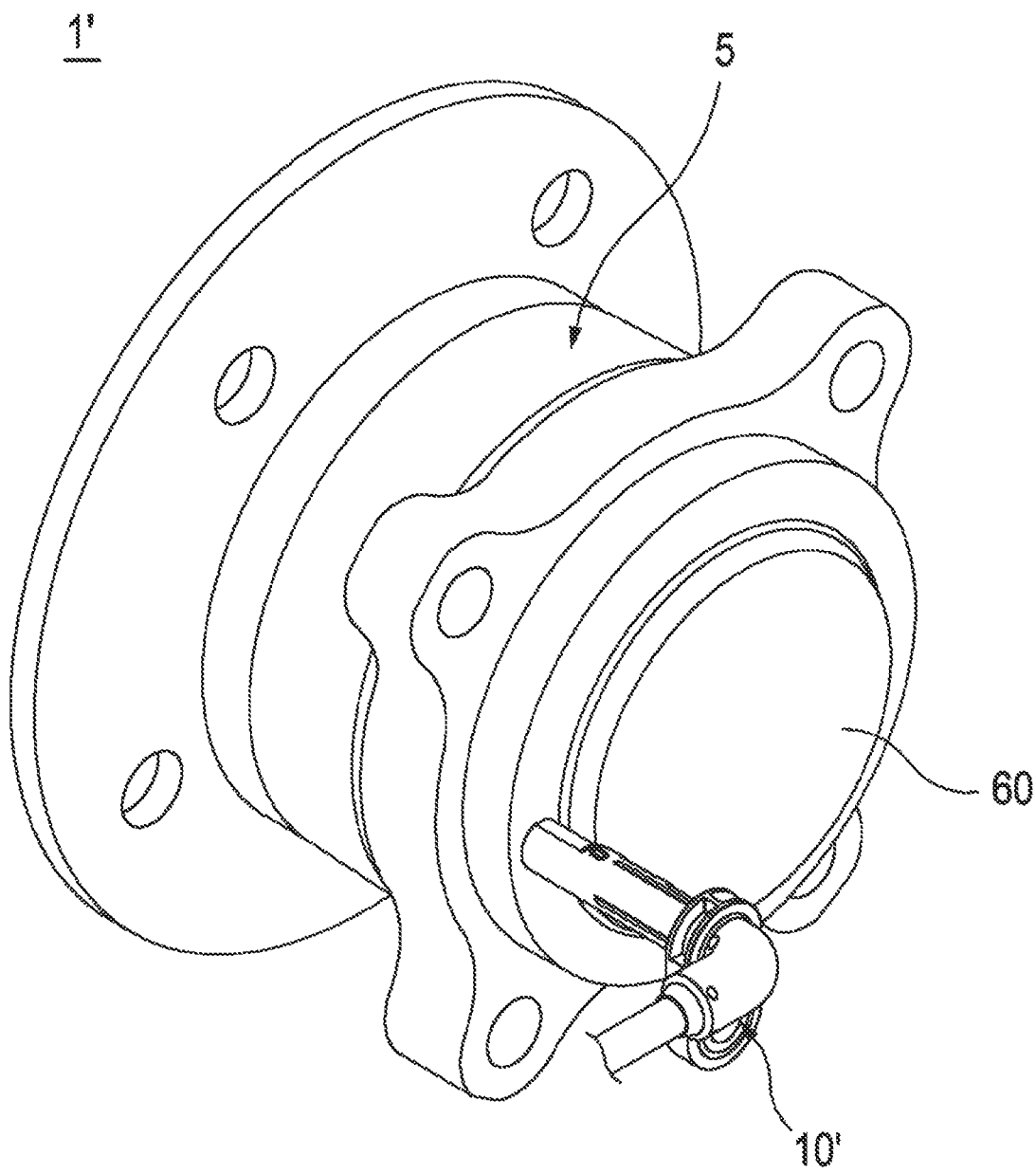
FIG. 3 is a perspective view of a wheel bearing assembly 1' according to another embodiment of the present disclosure.

FIG. 3 is a perspective view of a wheel bearing assembly 1' according to another embodiment of the present disclosure. Referring to FIG. 3, the wheel bearing assembly 1' according to another embodiment of the present disclosure will be described with a focus on differences from the wheel bearing assembly 1 according to the above embodiment.

A sensing device 10' of the wheel bearing assembly 1' according to the present embodiment extends in the axially direction IA or OA to form a distal end portion where sensing parts of the sensing device 10' is located. The plurality of sensing parts of the sensing device 10' may be arranged in a direction perpendicular to the axially direction IA or OA.

Hereinafter, a sensing device for vehicle according to one embodiment will be described in detail with reference to FIGS. 4 to 9.

In order to explain the present disclosure, a spatial rectangular coordinate system based on an X-axis, Y-axis and Z-axis that are perpendicular to each other is defined. Each axial direction (X-axis direction, Y-axis direction, Z-axis direction) means both directions in which each axis extends. A symbol "+" added in front of each axial direction (+X-axis direction, +Y-axis direction, +Z-axis direction) means a positive direction, which is one of both directions in which each axis extends. A symbol "−" added in front of each axial direction (−X-axis direction, −Y-axis direction, −Z-axis direction) means a negative direction, which is the other direction of both directions in which each axis extends. The expressions "Forward (+X)", "Backward (−X)", "Left (−Y) ", "Right (+Y)", "Upward (+Z)", "Downward (−Z)" as directional directives used herein are defined according to the XYZ coordinate axis. However, it should be noted that this is nothing more than one example for clearly explaining the present disclosure and each direction may be defined differently depending on where the reference is placed.

Figure 4:
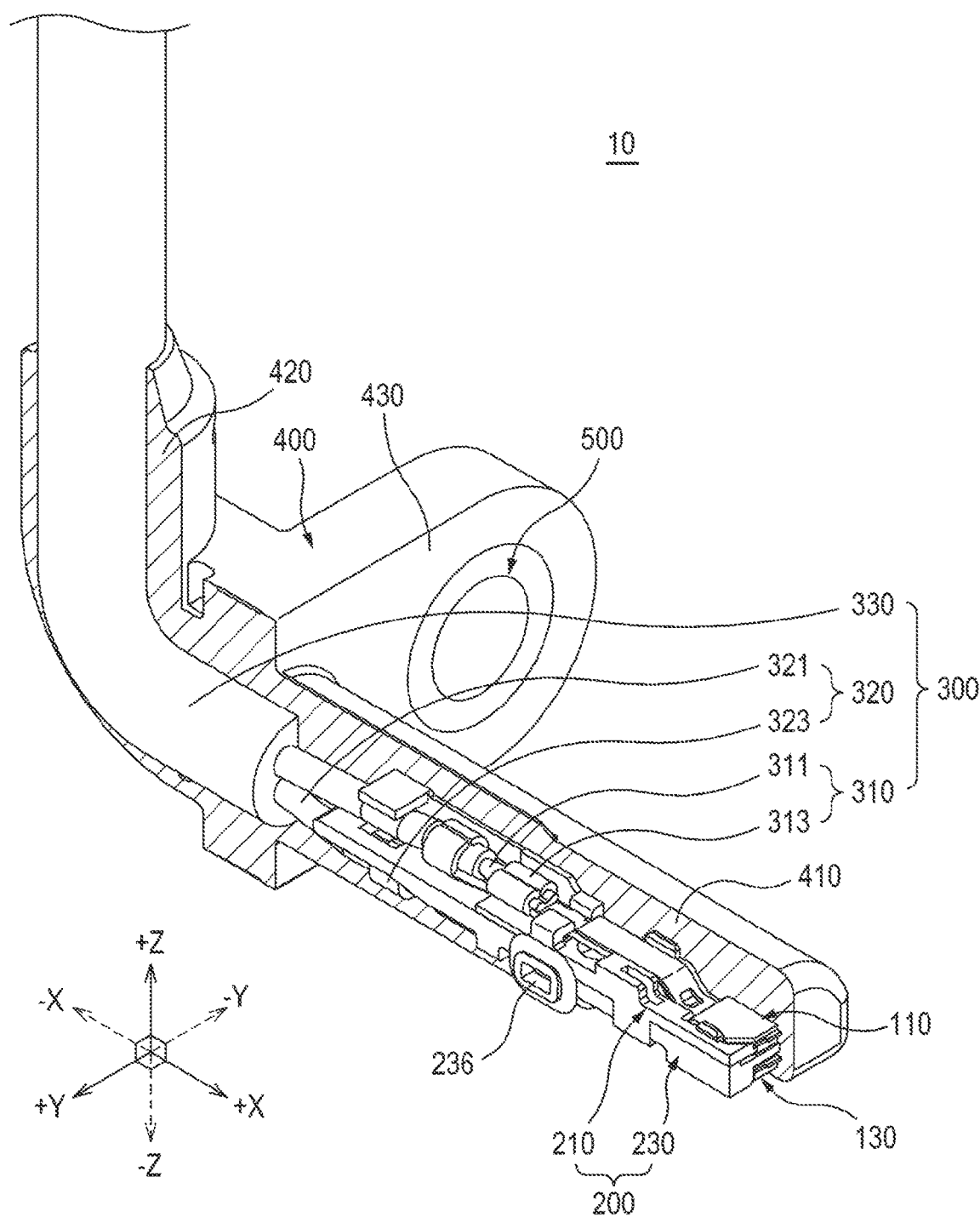
FIG. 4 is a perspective view of a sensing device for vehicle according to one embodiment of the present disclosure where a portion of a body is cut.

FIG. 4 is a perspective view of the sensing device for vehicle according to one embodiment of the present disclosure where a portion of the body is cut. Referring to FIG. 4, the sensing device comprises a plurality of sensing parts 110 and 130, an insert 200, a connection unit 300, the body 400, and a fixing part 500.

The plurality of sensing parts 110 and 130 comprise a first sensing part 110 and a second sensing part 130 arranged in the body 400. The first sensing part 110 and the second sensing part 130 are disposed in the body 400 at a front portion of the body 400. The first sensing part 110 and the second sensing part 130 are vertically arranged.

The first sensing part 110 senses first information related to the wheel to generate a first signal. The second sensing part senses second information related to the wheel to generate a second signal. The plurality of sensing parts 110 and 130 may comprise an Integrated Circuit (IC) that performs a signal generation function.

The first information and the second information sensed by the sensing parts may be information related to the wheel, may be the same or may be different from each other. Hereinafter, examples of the first information and the second information will be described. For example, such information (the first information and/or the second information), which may be the rotation speed information of the wheel, the rotation angle information of the wheel, or information on the presence or absence of abnormality of the target, may be a change in a magnetic field or intensity information of the magnetic field. As another example, the information may be temperature information of a place where one sensing part is located, and the temperature information may be used to compensate for another signal generated by another sensing part. As another example, the information may be acceleration or pressure information. Based on the acceleration or the pressure information, the ECU may determine the environment of a place where the sensing parts are located and the presence or absence of abnormality of the sensing parts. In the present embodiment, at least one of the first information and the second information comprises the rotation speed information of the wheel.

As an example, both the first information and the second information sensed by the sensing parts are the rotation speed information of the wheel. Each of the first sensing part 110 and the second sensing part 130 may comprise an IC for wheel speed sensor. With this configuration, even when a single sensing device is used, the reliability of the operation of sensing the rotation speed of the wheel may be improved. Further, even if an abnormality occurs in one of the two sensing parts 110 and 130, it is possible to sense the rotation speed information of the vehicle.

As another example, the first information may be the rotation speed information of the wheel and the second information may be the rotation angle information of the wheel. The first sensing part 110 may comprise an IC for wheel speed sensor and the second sensing part 130 may comprise an IC for high resolution wheel rotation position sensor (HR IC). As another example, the first information may be the rotation speed information of the wheel and the second information may be the information on whether or not an abnormality occurs in the target. The first sensing part 110 may comprise an IC for wheel speed sensor and the second sensing part 130 may comprise a linear IC. With this configuration, it is possible to sense the wheel rotation speed and additional other information using a single sensing device.

As another example, the first information may be the rotation speed information of the wheel and the second information may be the temperature information. The first sensing part 110 may comprise an IC for wheel speed sensor and the second sensing part 130 may comprise a temperature sensor. With this configuration, it is possible to compensate for the generated first signal according to the sensed temperature information.

Types of the first signal and the second signal may be the same or different from each other. The first signal and the second signal may constitute a signal interface corresponding to an application, and types of the signals may be varied according to characteristics of the vehicle. For example, the signal(s) (the first signal and/or the second signal) may be generated in any one form of a square wave, a pulse width modulation (PWM) signal, an AK-protocol (ArbeitsKreis protocol) signal, an incremental signal, a serial peripheral interface (SPI) signal, a single edge nibble transmission (SENT) signal, an application binary interface (ABI) signal and a UVW three-phase signal. As an example, both the first signal and the second signal may be the PWM signal. As another example, the first signal may be the PWM signal, and the second signal may be any one of the AK-protocol signal, the incremental signal, the SPI signal, and the SENT signal.

The insert 200 comprises a first insert 210 to which the first sensing part 110 is fixed and a second insert 230 to which the second sensing part 130 is fixed. The first sensing part 110 is fixed to an upper portion of the first insert 210, and the second sensing part 130 is fixed to a lower portion of the second insert 230. The second insert 230 is coupled to the first insert 210 in a vertical direction. The first insert 210 and the second insert 230 are supported by the body 400.

At least a portion of the first insert 210 and at least a portion of the second insert 230 are disposed in the body 400. A portion of the insert 200, which supports the plurality of sensing parts 110 and 130, is disposed in the body 400. In the present embodiment, the insert 200 is disposed inside the body 400 except for a partial surface of a mold support part 236.

The connection unit 300 comprises at least one first connection part 310 for connecting the first sensing part 110 in a wired manner, and at least one second connection part 320 for connecting the second sensing part 130 in a wired manner. The first connection part 310 is connected to the first sensing part 110 to supply first power to the first sensing part 110 or transmit the first signal from the first sensing part 110. The second connection part 320 is connected to the second sensing part 130 to supply second power to the second sensing part 130 or to transmit the second signal from the second sensing part 130.

The first power and the second power may be the same or different from each other. The first power and the second power may be supplied from the same power supply. Alternatively, the first power and the second power may be supplied from different power supplies, respectively.

The first connection part 310 comprises a first connection line 311 formed in a wire shape. The first connection line 311 may comprise an inner metallic conductive wire portion and a covering part that covers the inner metallic conductive wire portion. The covering part may be configured to expose one end portion of the inner metallic conductive wire portion.

The first connection part 310 may further comprise a first terminal 313 that constitutes one end portion of the first connection part 310. The first terminal 313 is arranged to connect the first connection line 311 and the first sensing part 110. In the present embodiment, the first connection part 310 comprises the first connection line 311 and the first terminal 313. However, in another embodiment (not shown), the first connection part 310 may comprise the first connection line 311 alone, and the end of the first connection line 311 may be directly connected to the first sensing part 110.

The second connection part 320 comprises a second connection line 321 formed in a wire shape. The second connection line 321 may comprise an inner metallic conductive wire portion and a covering part that covers the inner metallic conductive wire portion. The covering part may be configured to expose one end portion of the inner metallic conductive wire portion.

The second connection part 320 may further comprise a second terminal 323 that constitutes one end portion of the second connection part 320. The second terminal 323 is arranged to connect the second connection line 321 and the second sensing part 130. In the present embodiment, the second connection part 320 comprises the second connection line 321 and the second terminal 323. However, in another embodiment (not shown), the second connection part 320 may comprise the second connection line 321 alone, and the end of the second connection line 321 may be directly connected to the second sensing part 130.

The connection unit 300 may further comprise a covering member 330 that collectively covers the plurality of connection lines 311 and 321. The covering member 330 encloses the first connection line 311 and the second connection line 321 so that the covering member 330, the first connection line 311 and the second connection line 321 may constitute a cable. The covering member 330 may be configured to expose one end portions of the plurality of connection lines 311 and 321. The one end portions of the plurality of connection lines 311 and 321 may be separated from each other.

The sensing device for vehicle according to an embodiment of the present disclosure comprises the body 400 arranged fixedly relative to the outer ring part 40. The body 400 comprises the first sensing part 110 and the second sensing part 130 provided therein. The body 400 supports the first insert 210 and the second insert 230. In the state in which the insert 200 is disposed, the body 400 is overmolded. In a state in which the first insert 210 and the second insert 230 are locked, the body 400 is injection-molded with a plastic material so that the first insert 210 and the second insert 230 are fixed to the body 400.

The body 400 comprises an insert covering part 410 that covers the insert 200, and a cable covering part 420 that covers one end portion of the connection unit 300. In addition, the body 400 comprises a flange part 430 in which a fixing part 500 is arranged. The insert covering part 410, the cable covering part 420, and the flange part 430 are integrally formed.

The fixing part 500 fixes the body 400 to the vehicle body, the outer ring part 40, the cap 60, or the like. The fixing part 500 may have a hole formed in the center thereof and through which a fastening member passes. In a state in which the fixing part 500 is disposed, the body 400 is injection-molded so that the fixing part 500 may be fixed to the body 400.

Figure 5:
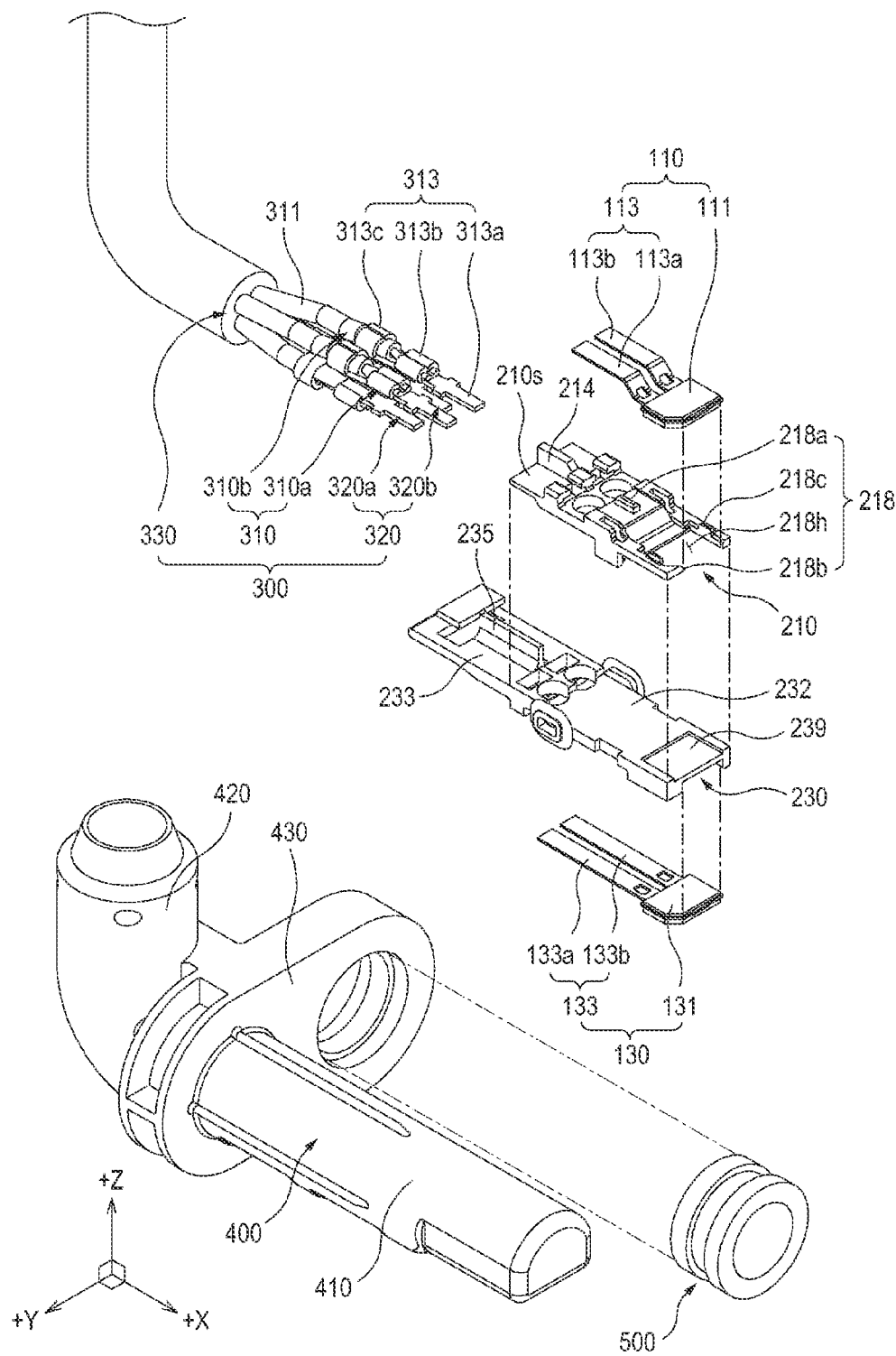
FIGS. 5 and 6 are exploded perspective views of the sensing device in FIG. 4, when viewed in different directions.
Figure 6:
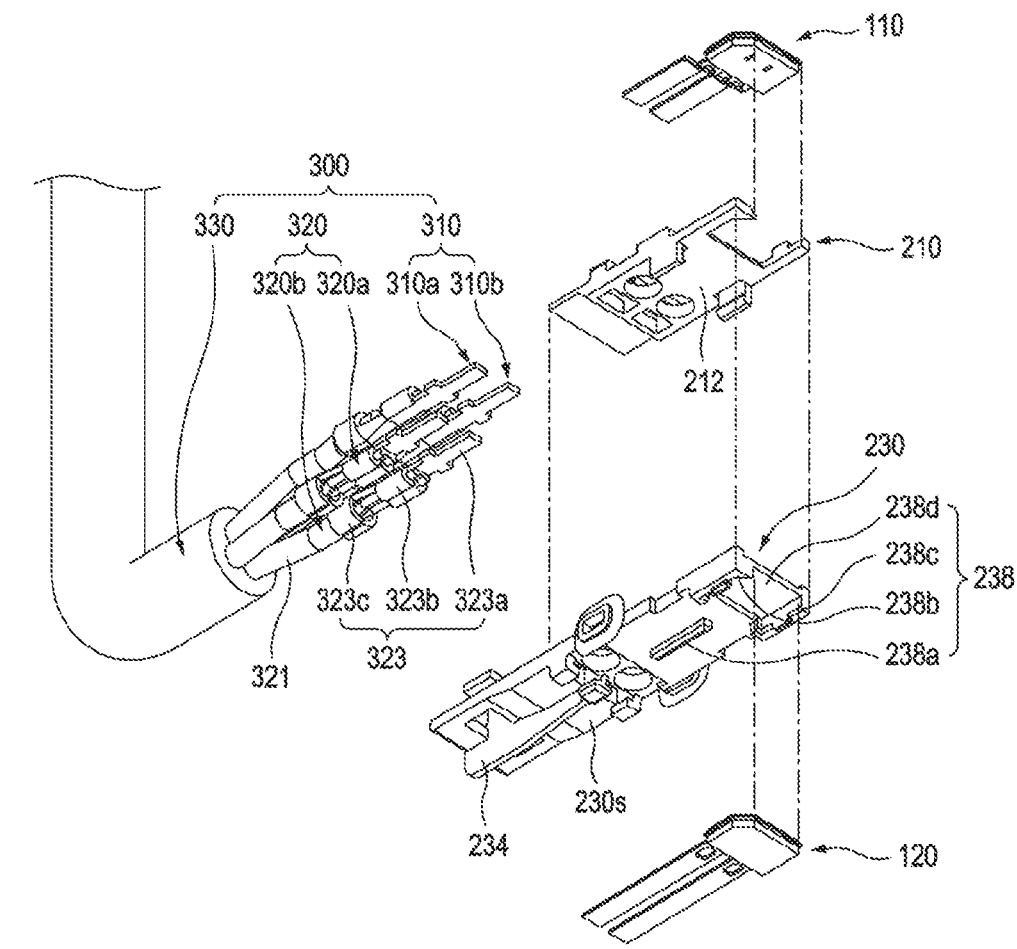
Figure 6:
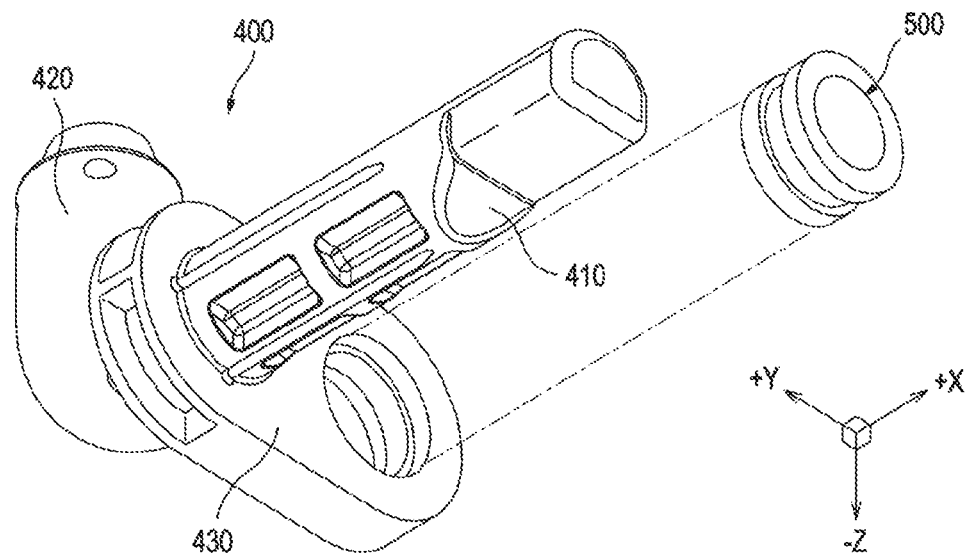

FIGS. 5 and 6 are exploded perspective views of the sensing device of FIG. 4 when viewed in different directions. Referring to FIGS. 5 and 6, the first sensing part 110 comprises a first sensor 111 configured to generate the first signal. The first sensor 111 senses the first information. The first sensor 111 receives the first power and performs a function The first sensing part 110 is connected to the first connection part 310 and comprises a first terminal portion 113 which transmits the first signal to the first connection part 310 or receives the first power from the first connection part 310. In the present embodiment, the first terminal portion 113 is configured to comprise two first terminal portions 113a and 113b. One first terminal portion 113a receives the first power from the first connection part 310a, and the other first terminal portion 113b transmits the first signal from the first sensor 111 to the first connection part 310b.

The first terminal portion 113 may be formed to protrude backward from the first sensor 111. The plurality of first terminal portions 113a and 113b may be arranged at the left and right sides.

The second sensing part 130 comprises a second sensor 131 configured to generates the second signal. The second sensor 131 senses the second information. The second sensor 131 receives the second power and performs a function.

The second sensing part 130 is connected to the second connection part 320 and comprises a second terminal portion 133 which transmits the second signal to the second connection part 320 or receives the second power from the second connection part 320. In the present embodiment, the second terminal portion 133 may comprise two second terminal portions 133a and 133b. One second terminal portion 133a receives the second power from the second connection portion 320a, and the other second terminal portion 133b transmits the second signal from the second sensor 131 to the second connection part 320b.

The second terminal portion 133 may be formed to protrude backward from the second sensor 131. The plurality of second terminal portions 133a and 133b may be arranged at the left and right sides.

The first insert 210 comprises a first-sensing-part guide 218 configured to guide the position of the first sensing part 110. The first-sensing-part guide 218 comprises a first terminal portion guide 218a configured to guide the position of the first terminal portion 113, and first sensor guides 218b and 218c configured to guide the position of the first sensor 111. A guide hole 218h is formed between the pair of first sensor guides 218b and 218c located in the left and right directions. The first sensor 111 is located at a position of the guide hole 218h.

The first insert 210 comprises a coupling surface 212 facing the second insert 230 and a first outer surface 210s opposite the coupling surface 212. The coupling surface 212 is oriented downward and the first outer surface 210s is oriented upward.

The first insert 210 comprises a first-connection-part guide 214 configured to guide the position of the one end portion of the first connection part 310. The first-connection-part guide 214 is arranged on the first outer surface 210s.

The second insert 230 comprises a second-sensing-part guide 238 configured to guide the position of the second sensing part 130. The second-sensing-part guide 238 comprises a second terminal portion guide 238a configured to guide the position of the second terminal portion 133, and second sensor guides 238b and 238c configured to guide the position of the second sensor 131. A downwardly-oriented guide surface 238d is formed between the pair of second sensor guides 238b and 238c located in the left and right directions. The second sensor 131 is located so that an upper surface of the second sensor 131 is in contact with the guide surface 238d.

The second insert 230 may comprise a sensing-part auxiliary guide 239. An upper surface of the sensing-part auxiliary guide 239 may be in contact with the lower surface of the first sensor 111. The sensing-part auxiliary guide 239 is disposed on the opposite side of the guide surface 238d. The sensing-part auxiliary guide 239 is disposed at a position corresponding to the guide hole 218h of the first insert 210.

The second insert 230 comprises a counterpart surface 232 in contact with the coupling surface 212 and a second outer surface 230s formed on an opposite side of the counterpart surface 232. The counterpart surface 232 is oriented upward and the second outer surface 230s is oriented downward.

The second insert 230 comprises a second-connection-part guide 234 configured to guide the position of one end portion of the second connection part 320. The second-connection-part guide 234 is arranged on the second outer surface 230s.

The second insert 230 comprises an auxiliary surface 233 which is oriented in the same direction with the counterpart surface 232. The auxiliary surface 233 is oriented upward. The auxiliary surface 233 is located backward of the counterpart surface 232.

The second insert 230 may further comprise an auxiliary guide 235 configured to guide the position of the first connection part 310. The auxiliary guide 235 is arranged on the auxiliary surface 233.

The plurality of first connection parts 310a and 310b may be provided. In the present embodiment, the first connection part 310a supplies the first power to the first sensing part 110, and the first connection part 310b transmits the first signal to the ECU.

The plurality of second connection parts 320a and 320b may be provided. In the present embodiment, the second connection part 320a supplies the second power to the second sensing part 130, and the second connection part 230b transmits the second signal to the ECU.

In the present embodiment, four connection parts 310a, 310b, 320a, and 320b are provided. However, a larger number of connection parts may be provided. For example, the first signal may comprise a plurality of signals, and the plurality of signals may be transmitted to the ECU through different connection parts, respectively.

In the present embodiment, the connection part 310a configured to supply the first power to the first sensing part 110 and the connection part 320a configured to supply the second power to the second sensing part 130 are separately provided. However, the first power and the second power may be supplied to the first sensing part 110 and the second sensing part 130, respectively, through a single common connection part.

One end portion of the first terminal 313 is connected to the first terminal portion 113. The first terminal 313 comprises a terminal connection portion 313a in contact with the first terminal portion 113. The terminal connection portion 313a and the first terminal portion 113 may be in contact with each other in the vertical direction.

The other end portion of the first terminal 313 is connected to the first connection line 311. The first terminal 313 is in contact with the metallic conductive wire portion of the first connection line 311. The first terminal 313 may comprise a first clamp 313b for clamping the metallic conductive wire portion of the first connection line 311 and a second clamp 313c for clamping the covered portion of the first connection line 311.

One end portion of the second terminal 323 is connected to the second terminal portion 133. The second terminal 323 comprises a terminal connection portion 323a in contact with the second terminal portion 133. The terminal connection portion 323a and the second terminal portion 133 may be in contact with each other in the vertical direction.

The other end portion of the second terminal 323 is connected to the second connection line 321. The second terminal 323 is in contact with the metallic conductive wire portion of the second connection line 321. The second terminal 323 may comprise a second clamp 323b for clamping the metallic conductive wire portion of the second connection line 321 and a second clamp 323c for clamping the covered portion of the second connection line 321.

Figure 7:
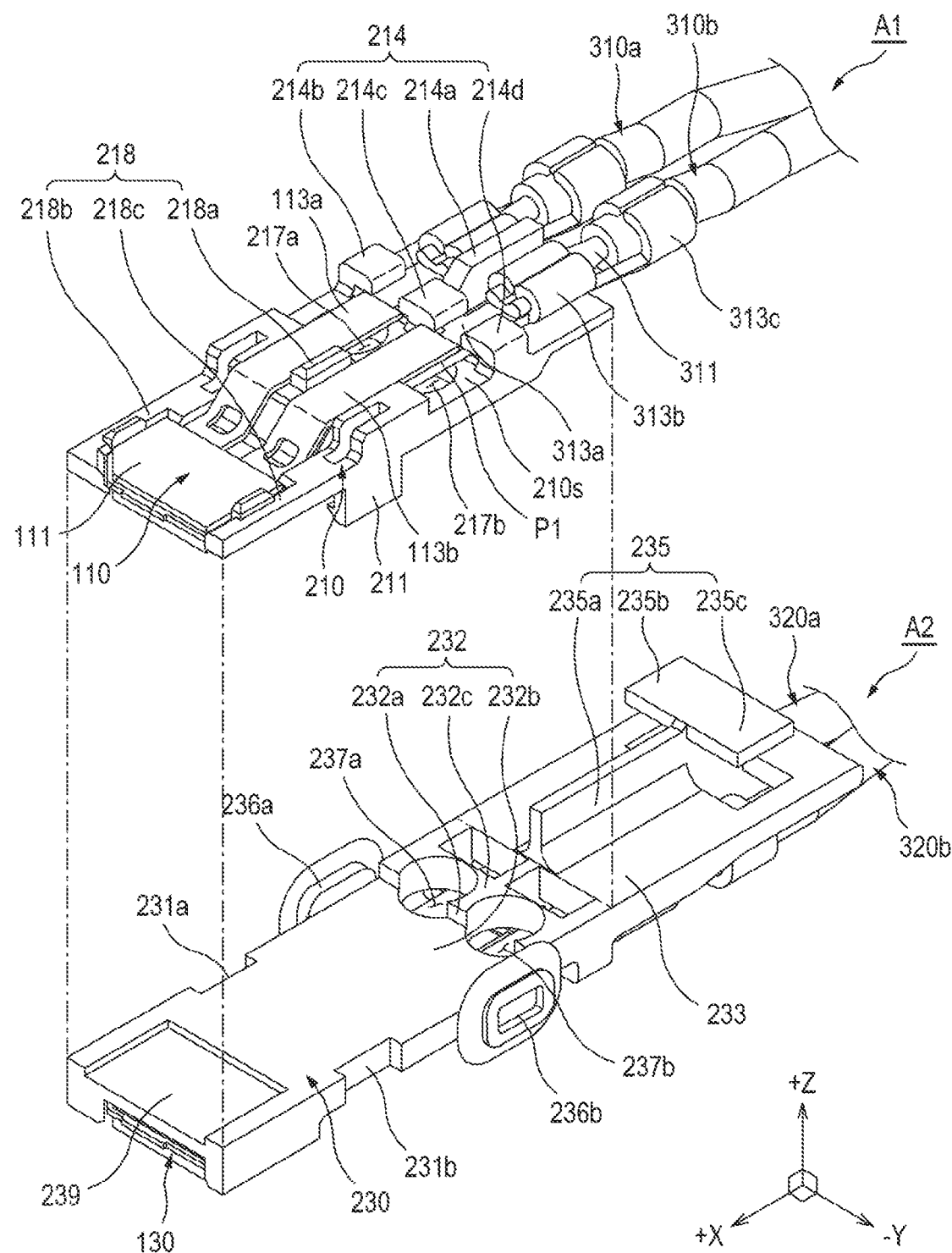
FIGS. 7 and 8 are exploded perspective views of a first assembly A1 and a second assembly A2 in FIG. 5.
Figure 8:
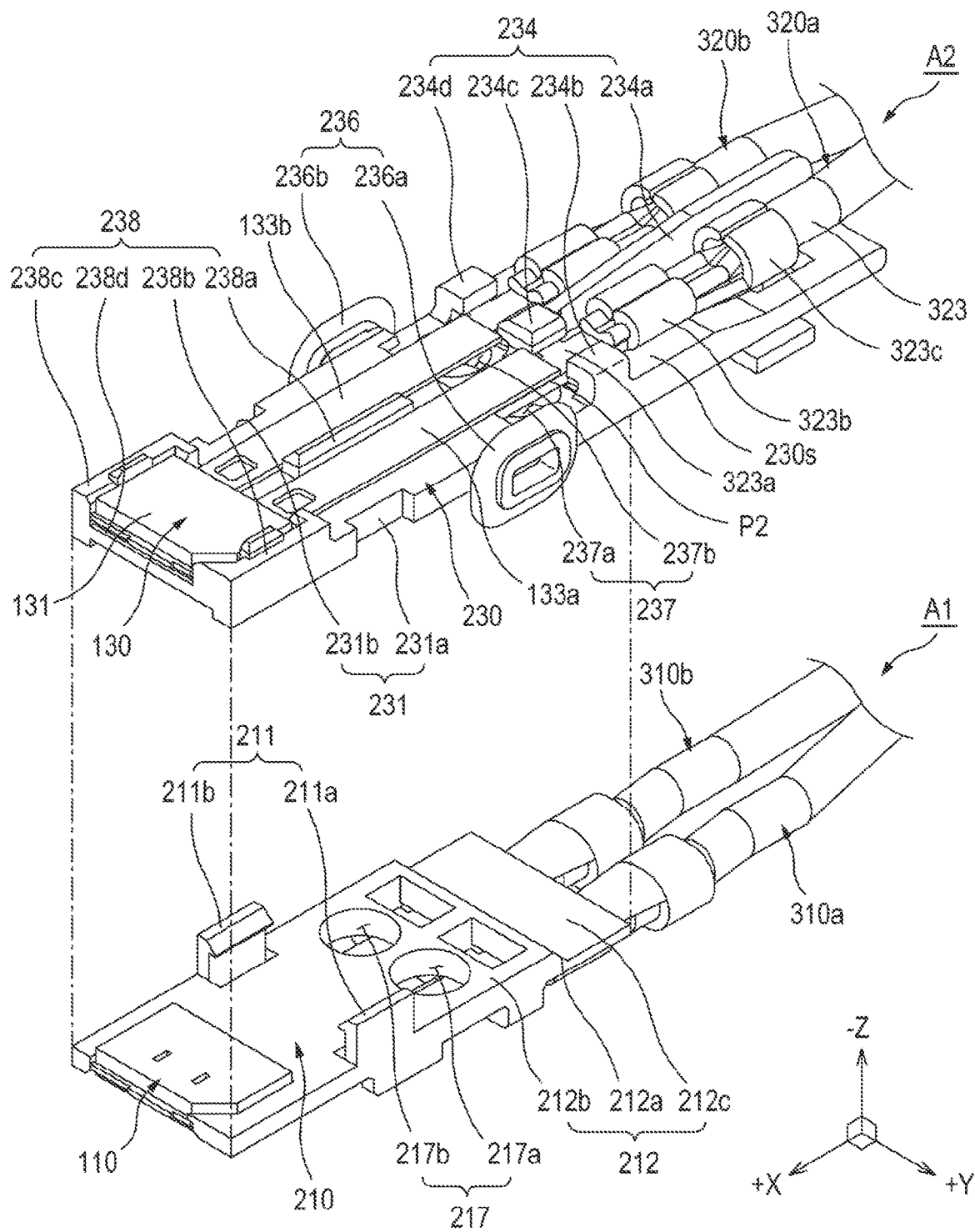
Figure 9:
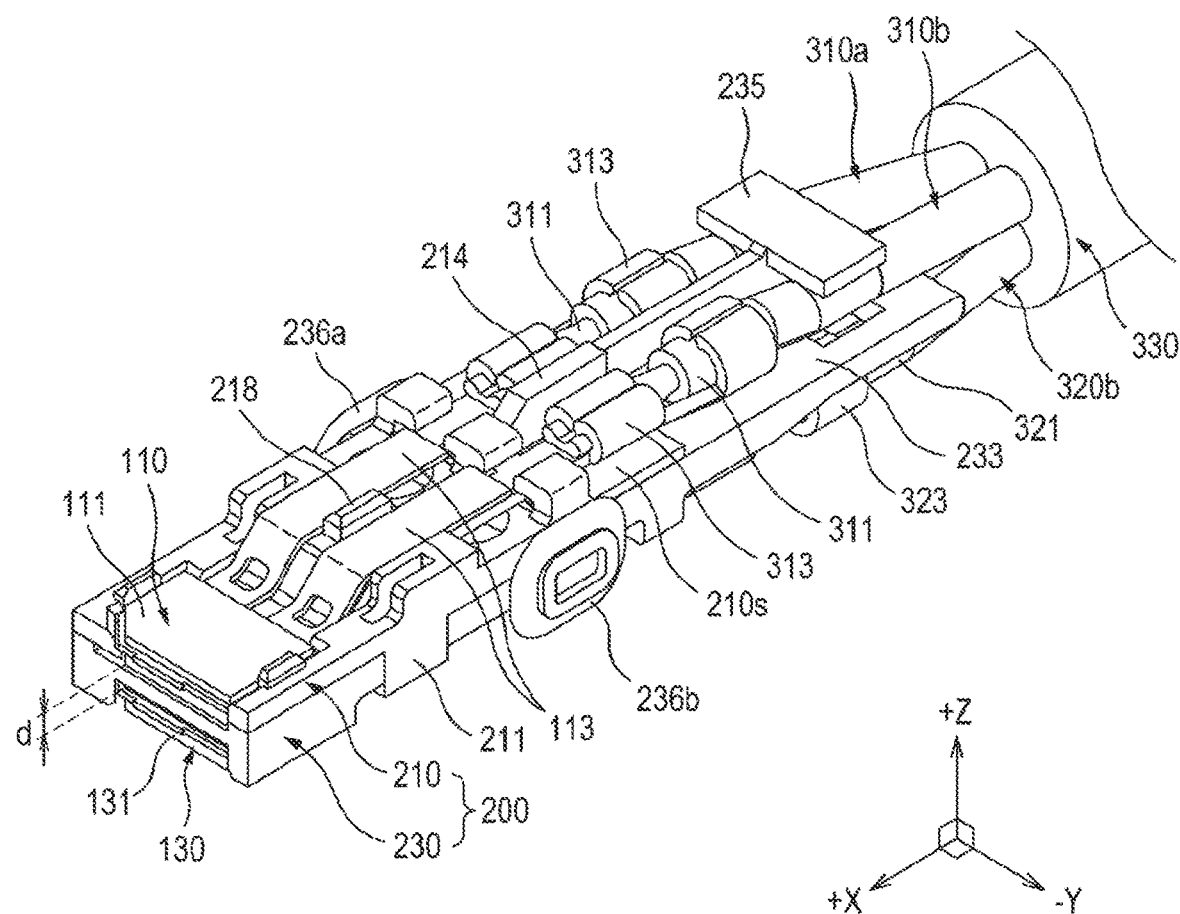
FIG. 9 is a perspective view showing a state in which the first assembly A1 and the second assembly A2 in FIG. 7 are coupled to each other.

FIGS. 7 and 8 are exploded perspective views of a first assembly A1 and a second assembly A2 in FIG. 5, when viewed in different directions. FIG. 9 is a perspective view showing a state in which the first assembly A1 and the second assembly A2 in FIG. 7 are coupled to each other.

Referring to FIGS. 7 to 9, the sensing device comprises the first assembly A1 and the second assembly A2 which are coupled to each other. The first assembly A1 comprises the first sensing part 110, the first insert 210, and the at least one first connection part 310. The second assembly A2 comprises the second sensing part 130, the second insert 230, and the at least one second connection part 320. FIGS. 7 and 8 show a state in which the first assembly A1 and the second assembly A2 are disassembled, and FIG. 9 shows a state in which the first assembly A1 and the second assembly A2 are coupled to each other.

A first connection point P1 at which the first sensing part 110 and the first connection part 310 are connected is located above the first insert 210. A second connection point P2 at which the second sensing part 130 and the second connection part 320 are connected is located above the second insert 230. The first insert 210 and the second insert 230 are located between the first connection point P1 and the second connection point P2. The first connection point P1 is located above the first outer surface 210s, and the second connection point P2 is located below the second outer surface 230s.

The first insert 210 comprises a coupling portion 211 formed to protrude toward the second insert 230. A pair of coupling portions 211a and 211b may be provided at the left and right sides. The coupling portion 211 may form a hook. The coupling portion 211 is arranged on both sides of the coupling surface 212.

The coupling surface 212 of the first insert 210 comprises a vertically stepped surface 212a. The stepped surface 212a is formed on a surface facing the second insert 230 of the first insert 210. The coupling surface 212 may comprise a first surface 212b and a second surface 212c. The stepped surface 212a may be disposed between the first surface 212b and the second surface 212c. The first surface 212b may be parallel to the second surface 212c. The first surface 212b is formed at a lower position vertically than the second surface 212c. The first surface 212b is located in front of the second surface 212c.

The first-connection-part guide 214 of the first insert 210 comprises a separation guide 214a, which protrudes upward from the first outer surface 210s and extends in the forward and backward direction. The separation guide 214a is disposed between two adjacent first connection parts 310a and 310b. The first-connection-part guide 214 comprises a fixing guide 214b, 214c and 214d for fixing one end portion of the first connection part 310 to the first insert 210. The fixing guides 214b, 214c and 214d may be formed in a hook shape. In the present embodiment, one end portion of the first connection part 310a is fixed to the two fixing guides 214b and 214c, and one end portion of the first connection part 310b is fixed to the two fixing guides 214c and 214d.

The first insert 210 has a first hole 217 formed at a portion corresponding to the first connection point P1. The first hole 217 is located below the first connection point P1. The first hole 217 is located between the first connection point P1 and the second connection point P2.

The first hole 217 may vertically penetrate the first insert 210. The first insert 210 and the second insert 230 may be coupled to each other in a direction parallel to the penetration direction (Z-axis direction) of the first hole 217.

A plurality of first holes 217a and 217b may be provided. The plurality of first holes 217a and 217b are formed at positions corresponding to connection points where the plurality of first terminal portions 113 are connected to the first connection part 310, respectively.

The second insert 230 comprises a coupling counterpart portion 231 of forming a groove into which the coupling portion 211 of the first insert 210 is engaged. A pair of coupling counterpart portions 231a and 231b may be provided at the left and right sides. The coupling counterpart portion 231 form a groove recessed inward from both sides of the second insert 230 and extending in the vertical direction.

The counterpart surface 232 of the second insert 230 further comprises a stepped counterpart surface 232a in contact with the stepped surface 212a of the first insert 210. The stepped counterpart surface 232a is formed on a surface facing the first insert 210 of the second insert 230. The counterpart surface 232 may comprise a first counterpart surface 232b and a second counterpart surface 232c. The stepped counterpart surface 232a may be disposed between the first counterpart surface 232b and the second counterpart surface 232c. The first counterpart surface 232b is in contact with the first surface 212b of the first insert 210, and the second counterpart surface 232c is in contact with the second surface 212c of the first insert 210. The auxiliary surface 233 of the second insert 230 is formed to extend backward from the second counterpart surface 232c.

The second-connection-part guide 234 of the second insert 230 comprises a separation guide 234a, which protrudes downward from the second outer surface 230s and extends in the forward and backward direction. The separation guide 234a is disposed between two adjacent second connection parts 320a and 320b. The second-connection-part guide 234 comprises fixing guides 234b, 234c and 234d for fixing one end portion of the second connection part 320 to the second insert 230. The fixing guides 234b, 234c and 234d may be formed in a hook shape. In the present embodiment, one end portion of the second connection part 320a is fixed to the two fixing guides 234b and 234c, and one end portion of the second connection part 320b is fixed to the two fixing guides 234c and 234d.

The auxiliary guide 235 of the second insert 230 comprises an auxiliary separation guide 235a, which protrudes upward from the auxiliary surface 233 and extends in the forward and backward direction. The auxiliary separation guide 235a is disposed between two adjacent first connection parts 310a and 310b. The auxiliary guide 235 may comprise auxiliary fixing guides 235b and 235c into which the first connection part 310 is engaged. The plurality of auxiliary fixing guides 235b and 235c may be configured to protrude in the left and right directions from an upper end of the auxiliary separation guide 235a and be in contact with the upper surface of the first connection part 310.

One of the first insert 210 and the second insert 230 comprises a mold support part 236 configured to be connected to a mold for injection-molding of the body 400. A relative position between the mold and the insert 200 may be set through the mold support part 236. The insert 200 may be arranged at a predetermined position inside the body 400. A plurality of mold support parts 236a and 236b may be provided at the left and right sides. In the present embodiment, only the second insert 230 has the mold support part 236.

The second insert 230 has a second hole 237 formed at a portion corresponding to the second connection point P2. The second hole 237 is located above the second connection point P2. The second hole 237 is located between the first connection point P1 and the second connection point P2.

The second hole 237 may vertically penetrate the second insert 230. The penetration direction of the first hole 217 and the penetration direction of the second hole 237 may be parallel to each other. The first insert 210 and the second insert 230 may be coupled to each other in a direction parallel to the penetration direction (Z-axis direction) of the second hole 237.

A plurality of second holes 237a and 237b may be provided. The plurality of second holes 237a and 237b are formed at positions corresponding to connection points where the plurality of second terminal portions 133 are connected to the second connection part 320, respectively.

The following descriptions will be made on a coupled body of the first insert 210 and the second insert 230 with reference to FIG. 9. The second insert 230 is formed to have a long length in the forward and backward directions than the first insert 210. The auxiliary surface 233 of the second insert 230 is located at the rear side of the first insert 210. The auxiliary surface 233 of the second insert 230 is located at the rear side of the first outer surface 210s of the first insert 210.

The auxiliary guide 235 of the second insert 230 is located at the rear side of the first-connection-part guide 214 of the first insert 210. The auxiliary guide 235 is arranged to extend backward from the first-connection-part guide 214.

The first sensing part 110 is arranged in one direction (+Z-axis direction) about the coupled body of the first insert 210 and the second insert 230, whereas the second sensing part 130 is arranged in a direction (−Z-axis direction) opposite the +Z-axis direction.

The first terminal portion 113 and the second terminal portion 133 are arranged outside the coupled body of the first insert 210 and the second insert 230. The first terminal portion 113 is arranged above the coupled body of the first insert 210 and the second insert 230, and the second terminal portion 133 may be arranged below the coupled body.

The first sensor 111 and the second sensor 131 may be in contact with each other or spaced apart from each other within a range of about 2 mm. A distance d between the first sensor 111 and the second sensor 131 may be in a range of about 0 to 2 mm. In the present embodiment, the first sensor 111 and the second sensor 131 are vertically separated from each other.

Figure 10:
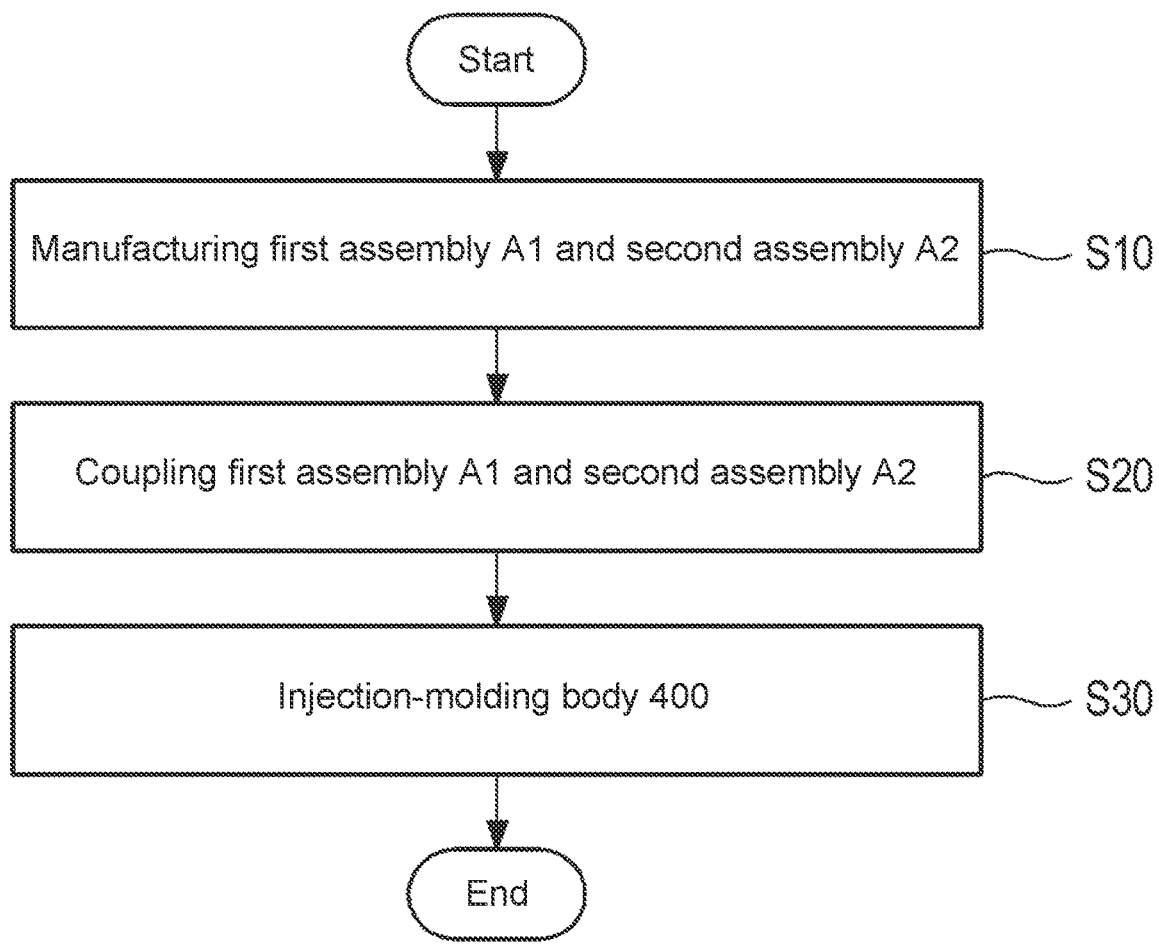
FIG. 10 is a flowchart for explaining a method of manufacturing a sensing device for vehicle according to one embodiment of the present disclosure.

FIG. 10 is a flowchart for explaining a method of manufacturing the sensing device for vehicle according to an embodiment of the present disclosure. Although processes, steps, algorithms, or the like have been described in sequential order in the flowchart shown in FIG. 10, such processes, steps, and algorithms may be performed in any suitable sequence. In other words, the processes, steps, and algorithms described in various embodiments of the present disclosure need not be performed in the order described in the present disclosure. Also, although some of the steps are described as being performed in an asynchronous manner, in another embodiment, some of these steps may be performed in a simultaneous manner. Further, exemplary processes illustrated in the drawings do not mean that they are not changed and modified in other forms. Further, some of the illustrated process or steps thereof may be omitted in one or more of various embodiments of the present disclosure. Further, it should be noted that the illustrated process is not necessarily essential.

Referring to FIG. 10, the method of manufacturing the sensing device for vehicle according to one embodiment of the present disclosure comprises a step S10 of assembling each of the first assembly A1 and the second assembly A2. In step S10, one end portion of the first connection part 310 and the first sensing part 110 are arranged on the first insert 210 to connect the first sensing part 110 and the first connection part 310, so that the first assembly A1 is manufactured. In addition, in step S10, one end portion of the second connection part 320 and the second sensing part 130 are arranged on the second insert 230 to connect the second sensing part 130 and the second connection part 320 so that the second assembly A2 is manufactured. Either the manufacturing process of the first assembly A1 or the manufacturing process of the second assembly A2 may be performed first, or they may be performed in a simultaneous manner.

In the embodiment in which the first terminal 313 and the second terminal 323 are provided, in step S10, the first terminal 313 and the first connection line 311 are coupled to each other, and the second terminal 323 and the second connection line 321 are coupled to each other. In this embodiment, in step S10, the first insert 210 and the first terminal 313 are coupled to each other, and the second insert 230 and the second terminal 323 are coupled to each other. In addition, in step S10, the first sensing part 110 and the first terminal 313 are connected to each other, and the second sensing part 130 and the second terminal 323 are connected to each other. This makes it easier to perform the manufacturing processes of the first assembly A1 and the second assembly A2.

As an example, in the step S10, the first terminal 313 and the first connection line 311 may be coupled to each other before the first terminal 313 is disposed in the first insert 210, and the second terminal 323 and the second connection line 321 may be coupled to each other before the second terminal 323 is disposed in the second insert 230.

The first connection part 310 and the first sensing part 110 may be connected to each other in various connection manners, and the second connection part 320 and the second sensing part 130 may also be connected to each other in various connection manners. Example of such connection manners may comprise resistance welding, laser welding, soldering, clamping, and the like.

In one embodiment, in step S10, a welding tool is inserted into the first hole 217 of the first insert 210 to weld the first sensing part 110 and the first connection part 310, and a welding tool is inserted into the second hole 237 of the second insert 230 to weld the second sensing part 130 and the second connection part 320. In this case, the first sensing part 110 and the first connection part 310 are welded while being in vertical contact with each other, and the second sensing part 130 and the second connection part 320 are welded while in vertical contact with each other. In the case of the resistance welding, two welding tools are required to be simultaneously brought into contact with the sensing part and the connection part, and two welding tools are required to be vertically located with the sensing part and the connection part interposed therebetween. To do this, one welding tool may be inserted into the first hole 217 upward from below the first insert 210 so that it is brought into contact with one end portion of the first connection part 310. In addition, the other welding tool may be inserted the second hole 237 downward from above the second insert 230 so that it is brought into contact with one end portion of the second connection part 320.

The method of manufacturing the sensing device for vehicle according to one embodiment of the present disclosure comprises step S20 of coupling the first assembly A1 and the second assembly A2 after step S10. In other words, in step S20, the first insert 210 and the second insert 230 are coupled to each other.

The method of manufacturing the sensing device for vehicle according to one embodiment of the present disclosure comprises step S30 of injection-molding the body 400 after step S20 above described. In other words, in step S30, the body 400 is injection-molded such that at least a portion of the first insert 210, at least a portion of the second insert 230, the first sensing part 110, and the second sensing part 130 are disposed inside the body 400. Accordingly, the body 400 is injection-molded in step S30 such that one end portion of the connection unit 300 is disposed inside the body 400. In addition, in step S30, the body 400 is injection-molded in a state in which the fixing part 500 is disposed. For example, in step S30, in a state in which the mold support part 236 of the insert 200 and the injection mold are connected to each other, the injection-molded material is injected into the mold to form the body 400.

Although the technical spirit of the present disclosure has been described using some embodiments and examples shown in the accompanying drawings, it should be noted that various substitutions, modification, and variations can be devised by those skilled in the art to which the present disclosure pertains without departing from the technical spirit and scope of the present disclosure. Further, it should be construed that these substitutions, modifications, and variations are included within the scope of the appended claims.

What is claimed is:

1. A sensing device for vehicle, comprising:
a first sensing part configured to sense first information related to a wheel to generate a first signal;
a second sensing part configured to sense second information related to the wheel to generate a second signal;
a first insert to which the first sensing part is fixed;
a second insert to which the second sensing part is fixed, the second insert being coupled to the first insert;
at least one first connection part connected to the first sensing part and configured to supply a first power to the first sensing part or to transmit the first signal from the first sensing part;
at least one second connection part connected to the second sensing part and configured to supply a second power to the second sensing part or to transmit the second signal from the second sensing part; and
a body configured to accommodate the first sensing part and the second sensing part therein and to support the first insert and the second insert.

2. The sensing device for vehicle of claim 1, wherein at least a portion of the first insert and at least a portion of the second insert are disposed in the body.

3. The sensing device for vehicle of claim 1, wherein the first sensing part is provided in one direction relative to a coupled body of the first insert and the second insert, and the second sensing part is provided in the opposite direction of the one direction.

4. The sensing device for vehicle of claim 1, wherein the first insert and the second insert are located between a first connection point where the first sensing part and the first connection part are connected to each other and a second connection point where the second sensing part and the second connection part are connected to each other.

5. The sensing device for vehicle of claim 1, wherein the first insert comprises:
a coupling surface formed to face the second insert;
a first outer surface formed to be oriented in the opposite direction of the coupling surface; and
a first-connection-part guide configured to guide a position of one end portion of the first connection part and provided on the first outer surface, and
the second insert comprises:
a counterpart surface formed to be in contact with the coupling surface;
a second outer surface formed to be oriented in the opposite direction of the counterpart surface; and
a second-connection-part guide configured to guide a position of one end portion of the second connection part and provided on the second outer surface.

6. The sensing device for vehicle of claim 5, wherein the second insert further comprises:
an auxiliary surface formed to be oriented in the same direction with the counterpart surface; and
an auxiliary guide configured to guide a position of the first connection part and provided on the auxiliary surface.

7. The sensing device for vehicle of claim 1, wherein
the first sensing part comprises:
a first sensor configured to generate the first signal; and
a first terminal portion connected to the first connection part and configured to transmit the first signal or receive the first power,
the second sensing part comprises:
a second sensor configured to generate the second signal; and
a second terminal portion connected to the second connection part and configured to transmit the second signal or receive the second power, and
the first terminal portion and the second terminal portion are arranged outside a coupled body of the first insert and the second insert.

8. The sensing device for vehicle of claim 1, wherein
the first sensing part comprises:
a first sensor configured to generate the first signal; and
a first terminal portion connected to the first connection part and configured to transmit the first signal or receive the first power, and
the second sensing part comprises:
a second sensor configured to generate the second signal; and
a second terminal portion connected to the second connection part and configured to transmit the second signal or receive the second power, and
the first sensor and the second sensor are in contact with each other, or spaced apart from each other by 2 mm or less.

9. The sensing device for vehicle of claim 1, wherein the first insert has a first hole formed at a portion corresponding to a first connection point where the first sensing part and the first connection part are connected, and
the second insert has a second hole formed at a portion corresponding to a second connection point where the second sensing part and the second connection part are connected.

10. The sensing device for vehicle of claim 9, wherein the first hole and the second hole are located between the first connection point and the second connection point.

11. The sensing device for vehicle of claim 9, wherein a penetration direction of the first hole and a penetration direction of the second hole are parallel to each other.

12. The sensing device for vehicle of claim 9, wherein the first insert and the second insert are coupled to each other in a direction parallel to a penetration direction of the first hole.

13. The sensing device for vehicle of claim 1, wherein the first insert comprises a coupling portion formed to protrude toward the second insert, and the second insert comprises a coupling counterpart portion of forming a groove into which the coupling portion is engaged.

14. The sensing device for vehicle of claim 13, wherein the first insert further comprises a stepped surface formed on a surface facing the second insert, and
the second insert further comprises a stepped-surface counterpart surface in contact with the stepped surface.

15. The sensing device for vehicle of claim 1, wherein at least one of the first information and the second information comprises rotation speed information of the wheel.

16. A wheel bearing assembly, comprising:
an outer ring part;
an inner ring part configured to be rotatable relative to the outer ring part while rotating together with a wheel; and
a sensing device configured to sense information related to the wheel,
wherein the sensing device comprises:

a body provided fixedly relative to the outer ring part;

a first sensing part provided in the body and configured to sense first information related to the wheel to generate a first signal;

a second sensing part provided in the body and configured to sense second information related to the wheel to generate a second signal;

a first insert supported by the body and to which the first sensing part is fixed;

a second insert supported by the body and to which the second sensing part is fixed, the second insert being coupled to the first insert;

at least one first connection part connected to the first sensing part and configured to supply a first power to the first sensing part or to transmit the first signal from the first sensing part; and at least one second connection part connected to the second sensing part and configured to supply a second power to the second sensing part or to transmit the second signal from the second sensing part.

17. A method of manufacturing a sensing device for vehicle, the method comprising:

step (a) of connecting a first sensing part and a first connection part by arranging the first sensing part and one end portion of the first connection part on a first insert, the first sensing part being configured to sense first information related to a wheel to generate a first signal and the first connection part being configured to supply a first power to the first sensing part or transmit the first signal from the first sensing part, and of connecting a second sensing part and a second connection part by arranging the second sensing part and one end portion of the second connection part on a second insert, the second sensing part being configured to sense second information related to the wheel to generate a second signal and the second connection part being configured to supply a second power to the second sensing part or transmit the second signal from the second sensing part; and step (b) of coupling the first insert and the second insert after the step (a).

18. The method of claim 17, further comprising: after the step (b), a step (c) of injection-molding a body such that at least a portion of the first insert, at least a portion of the second insert, the first sensing part and the second sensing part are disposed inside the body.

19. The method of claim 17, wherein in the step (a), a first terminal constituting the one end portion of the first connection part and a first connection line of the first connection part are coupled, and a second terminal constituting the one end portion of the second connection part and a second connection line of the second connection part are coupled.

20. The method of claim 17, wherein in the step (a), the first sensing part and the first connection part are welded by inserting a welding tool into a first hole of the first insert, and the second sensing part and the second connection part are welded by inserting the welding tool into a second hole of the second insert.

* * * * *